(12) United States Patent
Taijonlahti et al.

(10) Patent No.: US 6,408,726 B1
(45) Date of Patent: Jun. 25, 2002

(54) SHEET METAL WORK CENTER WITH A MOVABLE LOWER DIE OPERATIVE AS A STOPPER AND AN UPWARDS FORMING TOOL

(75) Inventors: Jorma Taijonlahti, Yliharma; Mikael Ollikainen, Lappeenranta, both of (FI)

(73) Assignee: Lillbacka Jetair OY, Kauhava (FI)

( * ) Notice: Subject to any disclaimer, the term of this patent is extended or adjusted under 35 U.S.C. 154(b) by 370 days.

(21) Appl. No.: 08/894,129

(22) PCT Filed: Nov. 19, 1996

(86) PCT No.: PCT/FI96/00626
§ 371 (c)(1),
(2), (4) Date: Dec. 2, 1997

(87) PCT Pub. No.: WO97/21504
PCT Pub. Date: Jun. 19, 1997

(30) Foreign Application Priority Data

Dec. 14, 1995 (FI) ................................................ 955989

(51) Int. Cl.⁷ ................................................ B21D 5/01
(52) U.S. Cl. ........................... 83/563; 83/623; 83/639.1
(58) Field of Search ................................. 83/563, 639.1, 83/698.91, 623, 639.5, 615, 527, 528, 529, 530

(56) References Cited

U.S. PATENT DOCUMENTS

| | | | | |
|---|---|---|---|---|
| 1,903,234 A | * | 3/1933 | Gray | 83/528 |
| 1,908,563 A | * | 5/1933 | Slabaugh et al. | 83/615 |
| 2,123,683 A | | 7/1938 | Oeckl | 72/305 |
| 2,182,162 A | * | 12/1939 | Ostberg | 83/528 |
| 2,211,864 A | * | 8/1940 | Schmied | 83/615 |
| 3,029,677 A | * | 4/1962 | Metzger | 83/620 |
| 3,392,613 A | * | 7/1968 | Johns | 83/623 |
| 3,640,167 A | * | 2/1972 | Axtmann | 83/623 |
| 3,667,305 A | | 6/1972 | Rasoira | 74/818 |
| 3,739,669 A | * | 6/1973 | Seki | 83/623 |
| 3,779,122 A | * | 12/1973 | Sawvell | 83/698.91 |
| 3,802,310 A | * | 4/1974 | Maurer | 83/527 |
| 4,387,583 A | | 6/1983 | Martin et al. | 72/20.2 |
| 4,672,831 A | | 6/1987 | Kogure et al. | 72/20.1 |
| 4,901,427 A | * | 2/1990 | Sakamoto et al. | 83/563 |
| 4,979,415 A | * | 12/1990 | Kakimoto | 83/698.91 |
| 5,052,208 A | | 10/1991 | Sartorio | 72/407 |
| 5,077,998 A | | 1/1992 | Santorio | 72/17.2 |
| 5,136,521 A | * | 8/1992 | Van Daalen et al. | 700/160 |
| 5,295,938 A | * | 3/1994 | Jilsen | 83/698.91 |
| 5,325,755 A | * | 7/1994 | Morita | 83/639.1 |
| 5,662,016 A | * | 9/1997 | Fujita | 83/698.91 |

FOREIGN PATENT DOCUMENTS

| | | |
|---|---|---|
| DE | 39 25 608 A1 | 2/1990 |
| DE | 34 34 470 C2 | 7/1994 |
| FI | 91830 | 5/1994 |

OTHER PUBLICATIONS

Japanese Abstract 57–195537 (Amanda K.K.), Dec. 1, 1992 (01.12.82), Fig. 1.

* cited by examiner

Primary Examiner—Kenneth E. Peterson
Assistant Examiner—Stephen Choi
(74) Attorney, Agent, or Firm—Louis Woo

(57) ABSTRACT

The invention relates to a sheet metal work center whose lower tool is mounted in a transfer device which is movable in the vertical direction in relation to the body in a way that the lower tool can optionally be moved by the transfer device to at least the following selectable positions in relation to the body: a) a lower position, whereat the lower tool is substantially accessible underneath the working level, particularly for exchange and/or maintenance operations, b) a middle position, whereat the lower tool is brought substantially to the working level to be used as a stopper for the upper tool to effect work on the sheet, and c) an upper position, whereat the lower tool is driven underneath the working level to conduct work on the lower surface of the sheet.

18 Claims, 7 Drawing Sheets

SHEET METAL WORK CENTER WITH A MOVABLE LOWER DIE OPERATIVE AS A STOPPER AND AN UPWARDS FORMING TOOL

FIELD OF INVENTION

The invention relates to a sheet metal work center.

BACKGROUND OF INVENTION

Generally in sheet metal working technology, for example in sheet punching, certain components are always needed. These include punches, a releasing plate or a releaser, and a lower tool or a so-called cushion. In sheet punching, the machining is conducted in a way that a punch is used to make a hole in a sheet against the lower tool or cushion, and the punch is drawn out of the hole either by a spring force or by another force, wherein the releasing plate prevents the punched sheet to rise with the punch, the plate remaining in its place. In sheet punching, there are two possibilities to conduct the machining: first, the releasing plate is in contact with the sheet to be punched during each punching stroke; or second, there is a certain air gap between the material to be punched and the releasing plate. Each method has its own advantages, i.e., when there is a contact with the plate at the punching stage, the plate will not vibrate during machining.

In current sheet metal working centers, stopping structures are still in use which have a mechanical connection with the machine bed. Height adjustments of the stopper in relation to the working level of the sheet to be machined are Known e.g. from the publication U.S. Pat. No. 5,136,521. However, the adjustment arrangements are made in a way that the full mechanical connection of the stopper to the machine bed is maintained. This results in several problems.

SUMMARY OF INVENTION

It is an aim of the present invention to eliminate the disadvantages involved in current constructions of sheet metal work centers, particularly in connection with stopper structures, and simultaneously to present new, surprising functional improvements in the functions of the stopper structures of sheet metal work centers. For achieving these aims, the sheet metal work center according to the invention has a lower tool that is adaptable to be driven to a number of positions for achieving different functions.

In particular, the basic idea in the present invention is to fix the lower tool of the stopper with a vertically movable transfer device, particularly a cylinder-piston mechanism using a pressurized medium. This solution gives, first of all, the advantage that the possibility of moving the transfer device can be utilized in automatic exchange of the lower tool. Using the transfer device, the functional parts of the stopper structure can e.g. be transferred underneath the working level into a position in which the lower tool can be released from the connection with the transfer device, e.g. with a manipulator. Secondly, the arrangement makes it possible to compensate for the effect of grinding operations that need to be made on the lower tool at regular intervals during its service life, on the thickness of the lower tool and thus on its position in relation to the working level. Thirdly, the transfer device makes it possible to implement forming by using the stopper structure in the sheet metal work center, i.e. the sheet can be machined from underneath the working level. Further, a fourth advantage of providing the transfer device with a cylinder-piston mechanism using pressurized medium is that the noise and vibration level of the sheet metal work center can be reduced to a considerable extent, because the impacts of the buffer do not hit the stationary body directly but the pressurized medium inside the cylinder-piston mechanism. This gives the necessary slight springiness which softens the working operation, and simultaneously the noise and vibration.

DESCRIPTION OF THE DRAWINGS

The invention will be described in more detail in the following description with reference to the embodiment shown in the appended drawings, wherein.

DETAILED DESCRIPTION OF INVENTION

Figure 1:
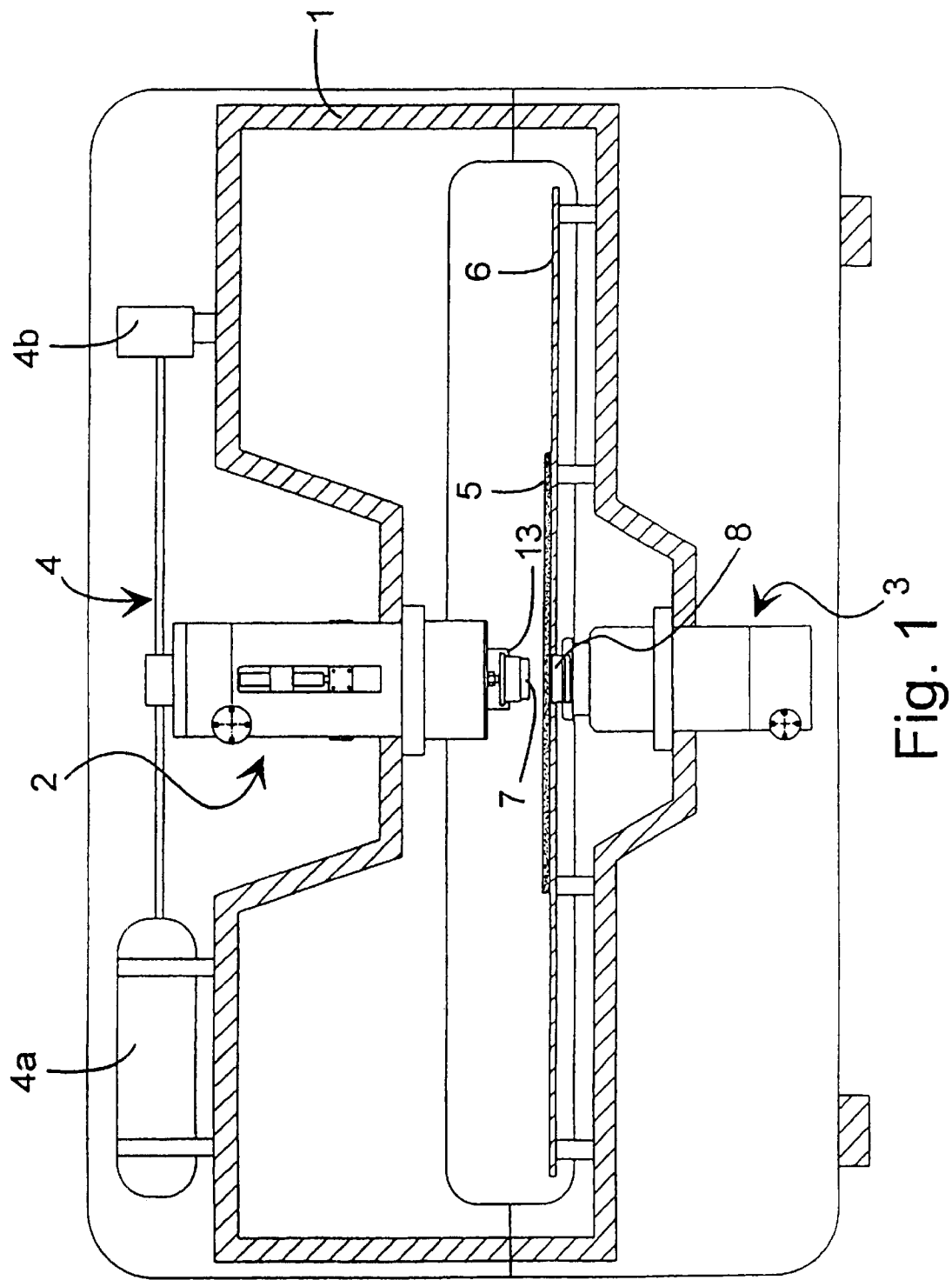
FIG. 1 is a schematic general view on a sheet metal working center according to the invention shown in a vertical cross-section.

With reference to FIG. 1, the reference numeral 1 indicates the machine body of the sheet metal work center, having a buffer structure 2 placed in its upper part and a stopper structure 3 placed in its lower part. The machine body has either a closed, circumferential O-structure or an open structure having e.g. a C-, J-form or the like. FIG. 1 shows also equipment related to the transfer device of the buffer indicated with the reference numeral 4, such as a hydraulic accumulator 4a and a valve block 4b. The sheet 5 to be worked is placed onto the machining level 6, underneath the upper tool or drift 7 and the releaser 13 and above the lower tool or stopper 8 in the stopper structure 3 between said parts 7, 13; 8. The sheet metal work center can be used for working at least the following operations: punching, forming, screwing, and other generally known working operations to be conducted with a sheet metal work center. Normally, the buffer structure 2 conducts the sheet punching operations with a downwards directed working movement. Alternatively, the lower tool 8 can be used for forming, wherein the working direction of the forming lower tool 8 is from below upwards.

Figure 2:
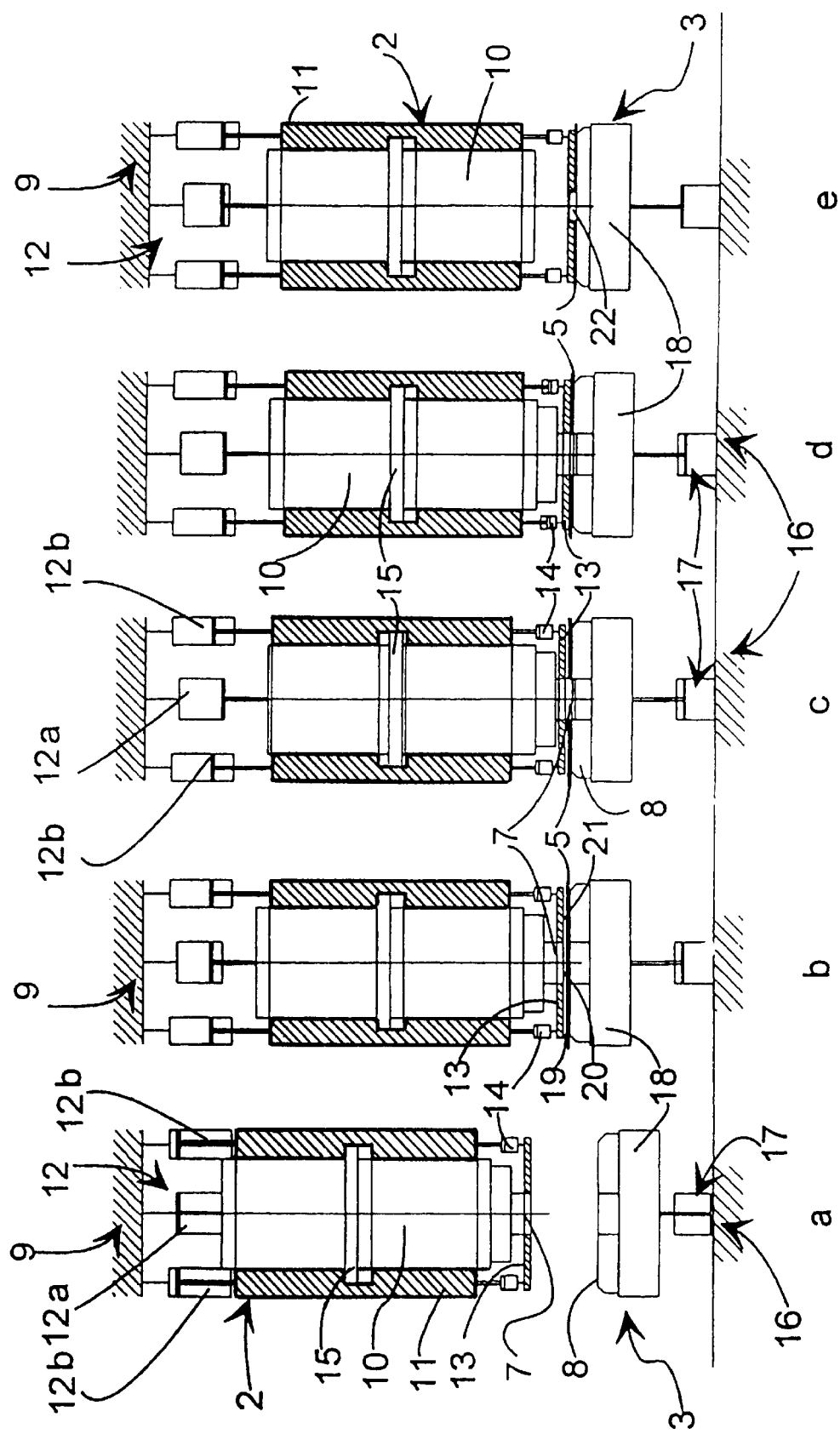
FIG. 2 is a schematic view illustrating the principle of the invention in steps a to e.

FIG. 2 shows steps a to e illustrating schematically some work stages to be conducted with the sheet metal work center. A punch stroke indicates in this context the work cycle of the buffer 10 and the upper tool 7, including the working operation and the return movement to the starting position.

FIG. 2a shows the buffer structure 2 and the stopper structure 3 in that drift exchange position, in which the upper tool 7 is exchanged in the buffer structure 2, and the releaser 13 and the stopper structure 3 in the position where the lower tool 8 is exchanged in it. The buffer structure 2 comprises as main parts a buffer fixing body 9, at which the buffer structure 2 is fixed to the machine body 1. Further, the buffer structure 2 comprises a buffer 10 and an auxiliary transfer body 11 which is effective outside the buffer 10 and is connected with the buffer fixing body 9 by means of a transfer device 12. Further, the lower part of the buffer structure 2 is provided with the upper tool 7 and the releasing plate or releaser 13 surrounding the upper tool 7 and being connected with the auxiliary transfer body 11 by means of the transfer device 14 of the releaser 13. Further, the buffer structure 2 comprises a locking arrangement 15 effective between the buffer 10 and the auxiliary transfer body 11 for locking the buffer 10 and the auxiliary transfer body 11 in relation to each other at certain work stages.

The transfer device 12 comprises as its first part a buffer transfer device 12a, effective between the buffer 10 and the buffer fixing body 9, and as its second part a transfer device 12b for the auxiliary transfer body 11, effective between the auxiliary transfer device 11 and the buffer fixing body 9.

The stopper structure 3 comprises as its main parts a stopper fixing body 16, at which the stopper structure 3 is fixed to the machine body 1. The stopper structure 3 comprises a stopper transfer device 17 arranged to be movable in the vertical direction in relation to the stopper fixing frame 16. The upper part of the stopper transfer device 17 is provided with the lower tool 8, fixed in a releasable manner with a tool fixing means 18.

FIG. 2b shows the starting position for a punching stroke, wherein the buffer 10 and the auxiliary transfer body 11 with the means connected to it are moved in connection with the sheet 5 in a way that the releaser is placed at a distance of air gap 19 from the top surface of the sheet 5. Thus the work levels 20, 21 of the upper tool 7 and the releaser 13 are substantially at the same level. At this stage, the control unit of the sheet metal work center can be used to make a selection between a so-called passive punching stroke, wherein the releaser will remain at the distance of said air gap 19 from the sheet 5, and a so-called active punching stroke, wherein the releaser 13 is brought into contact with the top surface of the sheet 5. The operations of this selection will be described in detail particularly with reference to FIG. 6.

FIG. 2c shows the stage of making a passive punching stroke, wherein the transfer device 12b of the auxiliary transfer body is locked to be stationary in relation to the buffer fixing body 9 and the releaser 13 remains in its position, maintaining the distance of the air gap 19 to the sheet 5. The locking arrangement 15 effective between the buffer 10 and the auxiliary transfer body 11 is released, wherein the buffer transfer device 12a can conduct a downwards directed work movement in relation to the auxiliary transfer body 11 and the buffer fixing body 9.

FIG. 2d, in turn, shows the stage of making an active punching stroke, wherein the locking arrangement 15 between the buffer 10 and the auxiliary transfer device 11 is locked and the transfer device 12b of the auxiliary transfer body is released, wherein the unit comprising the buffer 10 and the auxiliary transfer body 11 with the means related to it can be moved downwards by the buffer transfer device 12a. When the releaser 13 meets the surface of the sheet 5, the releaser transfer device 14 will yield for the auxiliary transfer body 11, producing a counterforce for the release of the upper tool 7 at the end of the buffer 10. One function of the transfer device 14 of the releaser 13 is particularly to generate an adjustable releasing force. FIG. 2d shows a situation, in which the upper tool 7 has punched the sheet, penetrating under the upper surface of the lower tool 8 of the stopper structure 3 within the scope of the adjustable stroke length.

FIG. 2e, in turn, shows the use of the sheet metal work center in forming, wherein the stopper structure 3 is used as the forming tool and the buffer structure 2 correspondingly as the stopper. Thus the upper tool 7 and the upper tool fixing means are removed from the buffer 10. The forming tool or the buffer 22 is fixed to the tool fixing device 18 in connection with the stopper structure 3. The releaser 13, or in this case the forming stopper, is lowered by using the second part 12b of the transfer device to the lowest position in connection with the sheet 5 to be worked, as shown in FIG. 2e, to effect a counterforce to the forming work. The releaser transfer device 14 is driven to a position in which the releaser transfer device 14 can yield in relation to the auxiliary transfer body in a direction perpendicular to the main level of the sheet to be worked.

In an advantageous embodiment, the buffer structure 2 is a substantially cylindrical form piece, wherein the buffer fixing body comprises a central hole, in which the substantially tubular auxiliary transfer body 11 is inserted. The buffer 10, in turn, has a primarily rod-like structure. All of the parts 9, 10 and 11 comprise constructive parts, which can be used to constitute the embodiment of buffer structure 2 shown in FIG. 7, using pressurized medium, particularly hydraulic fluid.

Figure 3:
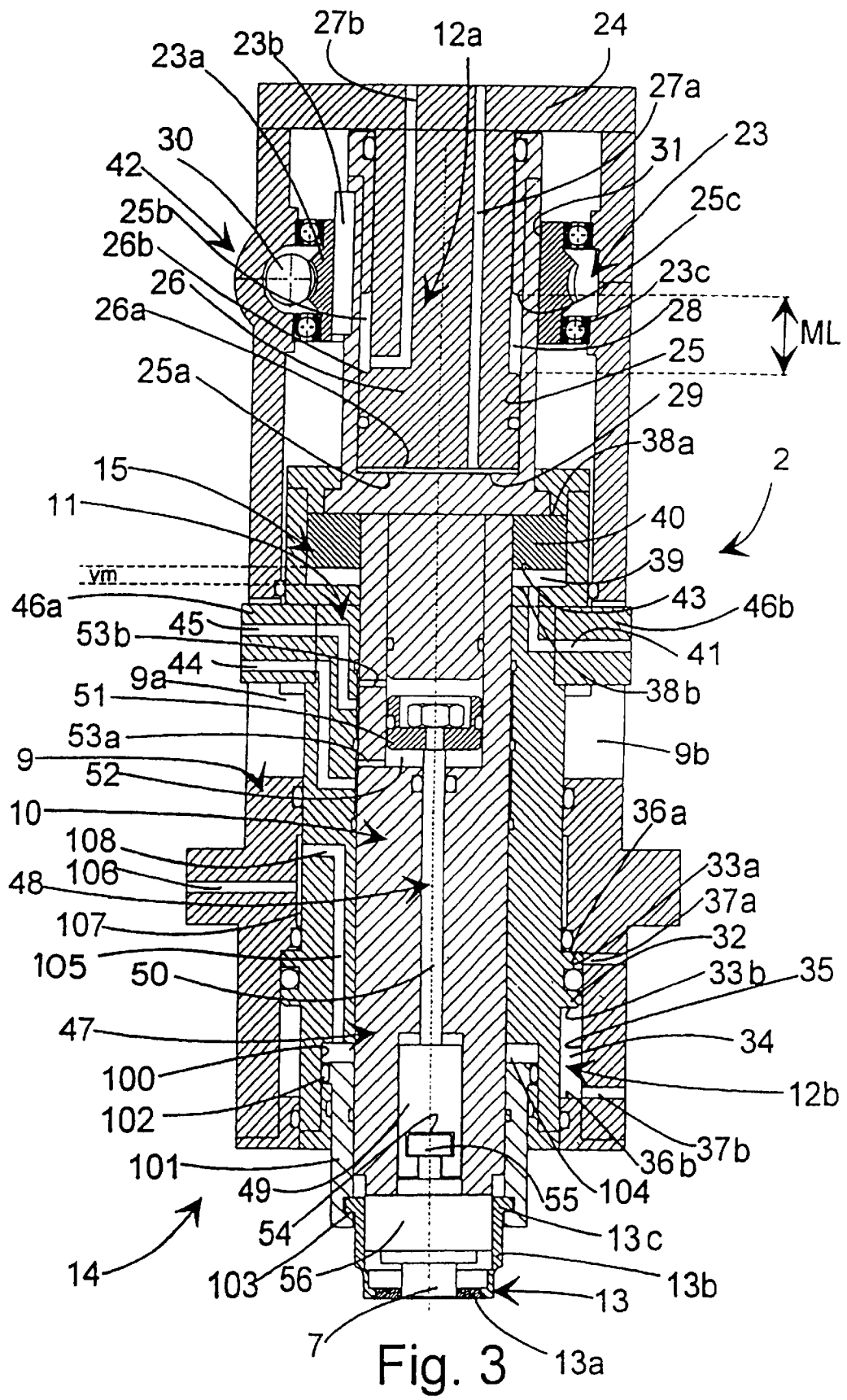
FIG. 3 is a vertical cross-sectional view on an embodiment of the buffer structure.

With particular reference to FIG. 3, the buffer 10 is further arranged to be rotary around the centring axle in alignment with the buffer structure by means of a rotating device 23 arranged in the upper part of the buffer structure 2. The buffer 10 is formed to have a hollow upper part comprising spaces 25a, 25b for pressurizing medium in a cylindrical hole 25 in the axial direction, wherein a stationary piston 26 fixed to the top cover 24 of the buffer fixing body 9 is placed in the hole 25. The top cover 24 is connected with a channel system 27a in the longitudinal direction of the piston 26, through which system the pressurized medium is led to the stationary piston 26 and further to the pressure space 25a, which is limited by the front surface 26a of the stationary piston 26 and the bottom 29 of the pressurized medium space 26a. A second channel system 27b, partly aligned with the stationary piston 26, is connected in the radial direction to the pressurized medium space 25b formed with the help of an insert 28. The above-mentioned structure constitutes a cylinder operating on the so-called differential principle. The length of the insert 28 (maximum distance between the radial surfaces 25c and 26b) in the longitudinal direction of the buffer 10 determines the maximum movement length ML of the buffer. The end surfaces of the insert 28 consist firstly of the radial surface 26b of the contraction of the stationary piston 26 and secondly of the radial surface 25c of the contraction of the hole.

On the outer surface of the buffer 10, between the buffer 10 and the buffer fixing body 9, a tooth wheel rim or a corresponding rotating means 23a is mounted on bearings 23c, driven by a worm pipe or a corresponding driving means 30, which in turn is mounted on bearings on the buffer fixing body 9. The above-mentioned gear arrangement, which in FIG. 3 is indicated with the reference numeral 42, is used to rotate the buffer 10 in relation to the buffer structure 2 around the vertical axle to achieve the desired angular position of the drift. The working movement of the buffer 10 is achieved by the pressurized medium supplied into the pressure space 25a, wherein the bush-like tooth wheel rim 23a surrounding the outer surface of the buffer 10 is arranged in relation to the fixing body 9 of the buffer 10 in a way that the necessary relative movement in the longitudinal direction of the buffer 10 takes place between the inner surface of the tooth wheel rim 23a and the outer surface of the upper part of the buffer 10 during working and return movements of the buffer 10 (surface 31). For transmission of the rotating force, a wedge part 23b is provided between the parts 10 and 23a. Thus, the unit presented above constitutes the transfer device 12a of the buffer 10 (FIG. 2).

In the lower part of the buffer structure 2, in turn, the transfer device 12b of the auxiliary transfer body 11 is arranged. It consists of an annular pressurized medium space 34 formed in the longitudinal direction of the buffer structure 2, between the auxiliary transfer body 11 and the buffer fixing body 9. Thus the outer surface of the auxiliary transfer body 11 is provided with an annular protruding flange 32, whose front surfaces 33a, 33b face said pressurized medium space 34. In a corresponding manner, the buffer fixing body 9 is provided with an outwards facing annular recess 35, whose front surfaces 36a, 36b face said pressurized medium space 34. The flange 32 is movable in the longitudinal direction of the buffer structure 2 in the recess 35. With the pressurized medium space 34, pressurized medium connectors, such as drillings or the like 37a and 37b, are provided, wherein the effect of the pressurized medium can be turned to the front surfaces 33a, 33b of the flange 32 in the auxiliary transfer body 11.

The locking arrangement 15 between the buffer 10 and the auxiliary transfer body 11 is formed after the buffer transfer device 12a in the longitudinal direction of the buffer. The buffer 10 is composed of two parts so that the circumference of its upper part is greater than the circumference of its lower part, wherein a radial front surface 38a is formed between said parts, forming part of the locking arrangement 15. In a corresponding manner, the auxiliary transfer body 11 is provided with an annular front surface 38b to make an annular pressurized medium space 39 in the axial direction. In the pressurized medium space 39, a rotary piston 40 is arranged, pressed on its axial surfaces on one hand against the outer surface of the lower part of the buffer 10 and on the other hand against the inner surface of the upper part of the auxiliary transfer body 11. The pressurized medium space 39 is connected via a pressurized medium connector 41 to the pressurized medium supply. In FIG. 3, the rotary piston 40 is shown in a position in which the buffer 10 is free to move the distance VM (free distance) in relation to the auxiliary transfer body 11. Thus the annular piston 40 is moved with the buffer 10, wherein the pressurized medium on the side of its front surface 43 is removed via the connector 41. This generates a downwards directed movement of the upper tool 7 in relation to the releaser 13.

The lower part of the buffer 10 is equipped with a tool exchange mechanism which is generally indicated with the reference numeral 47. A tool locking mechanism 48 comprises the combination of a lower chuck 49, a rod 50 and a piston part 51. This combination is placed in corresponding cylindrical drillings in the buffer 10 in the longitudinal direction. The upper part of the locking mechanism 48 is placed in pressurized medium space 52, wherein the lower surface of the piston part 51 is provided with locking by the pressurized medium at a pressure effective through pressurized medium connector 53a, wherein the locking mechanism 48 moves to its upper position shown in FIG. 3. In a corresponding manner, when effective through pressurized medium connector 53b, the locking mechanism moves to its lower position in the longitudinal direction of the buffer 10, wherein the upper tool 7 can be exchanged. The auxiliary transfer body 11 is penetrated by pressurized medium channels 44 and 45, through which the pressurized medium is led to the pressurized medium connectors 53a and 53b, respectively. The pressurized medium channels 44 and 45, like the pressurized medium connector 41, are placed in projections 46a (parts 44 and 45) and 46b (part 41), which are placed in corresponding axial grooves 9a and 9b, respectively, in the buffer fixing body 9. The lower part of the lower chuck 49 of the locking mechanism 48 is provided with a recess 54 holding a fixing adapter 55, and this is connected with an intermediate adapter 56 underneath the fixing adapter 55 and within the sleeve-like releaser 13. The fixing adapter 55 comprises a rod part extending in the longitudinal direction of the buffer 10 and having on its outer surface a threading which is placed in the threaded hole in the upper tool 7, wherein the upper tool 7 can be tightened against the lower front surface of the intermediate adapter 56 (screwing not shown in FIG. 3).

FIG. 3 shows further the transfer device 14 of the releaser 13 whose general functions were described with reference to FIG. 2. The lower part of the auxiliary transfer body 11, the inner surface of its tubular form, is provided with a recess 100 in the longitudinal direction of the buffer structure. The buffer 10 is surrounded by the sleeve-like frame part 101 of the transfer device 14. The upper part of the frame part 101 is provided with a flange part 102 movable in the recess 100. The lower part of the frame part 101 contains a groove-like ring clip 103 inside the sleeve form for fixing the releaser 13. The releaser 13 consists of a releaser plate 13a parallel to the main level of the sheet to be worked, a sleeve-like releaser frame 13b adjacent to its outer edge in the axial direction, and a flange 13c protruding in the radial direction from the upper edge of the releaser frame and placed in the ring clip 103. The releaser 13 can, in connection with the exchange of the tool 7, be exchanged e.g. by a manipulator. The recess 100 forms a pressurized medium space 104, into which and from which the pressurized medium is led via a channel system 105 penetrating the auxiliary transfer body 11 to a pressurized medium connector 106 in the buffer fixing body 9. Between the buffer fixing body 9 and the buffer 10, an annular space 107 is formed in the longitudinal direction of the buffer structure 2, making it possible to maintain the pressurized medium connection between the pressurized medium connector 106 and an end 108 in connection with the annular space 107 of the channel system 105.

Figure 4:
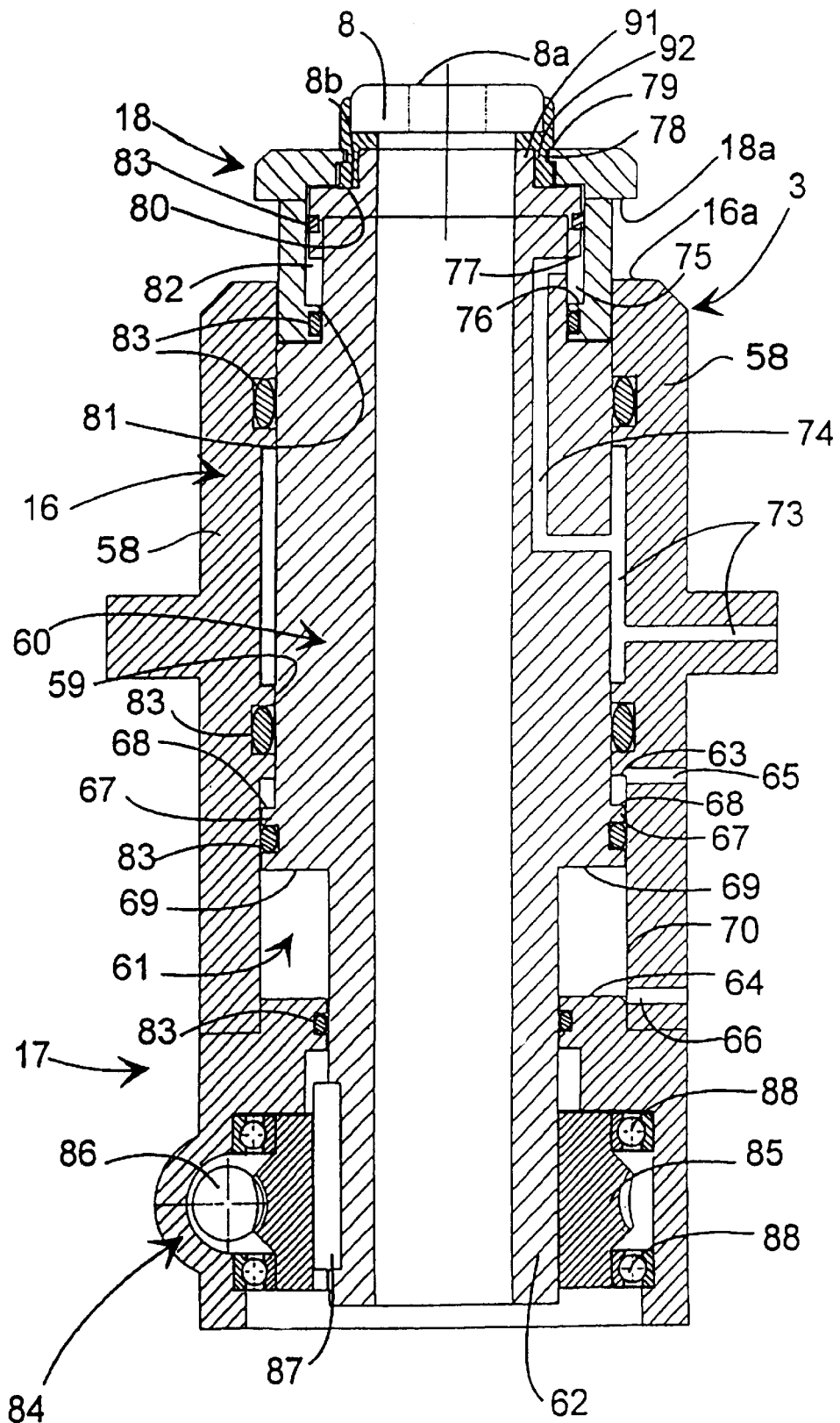
FIG. 4 is a vertical cross-sectional view on the stopper structure.

With reference to FIG. 4, the stopper structure 3 comprises firstly a stopper fixing body 16, at which the stopper structure 3 is fixed to the machine body 1 of the sheet metal work center. The fixing body 16 has advantageously the form of a cylindrical piece, whose inner or central hole 59 holds the tool fixing body 60 which is hydraulically arranged to move, if necessary, in the longitudinal direction of the central hole 59 of the stopper fixing body 16 and in the vertical direction with the transfer device 17, particularly its hydraulic cylinder-piston combination 61 which is placed in the lower part of the stopper structure 3 as an extension of the tool fixing body 60. Both the tool fixing body 60 and the piston rod 62 of the transfer device 17 formed as an extension thereof are primarily hollow, tubular form pieces.

The upper part of the tool fixing body 60 is provided with the fixing device 18 of the lower tool or the stopper 8. When the sheet metal work center is used for forming, the lower tool is a buffer (cf. FIG. 2e).

In accordance with the invention, the tool fixing body 60, the lower tool 8 and the fixing device 18 can be placed by the cylinder-piston combination 61 in several height positions in relation to the stopper fixing body 16 and the working level 6 (cf. FIG. 1). In the lower position (situation A), the lower tool 8 is accessible in the so-called exchange position underneath the lower surface of the working level 6, wherein the lower tool 8 can be exchanged e.g. by a manipulator, or it can be serviced. Secondly, in the so-called middle position (situation B) the upper surface 8a of the lower tool 8 is substantially at the level of the upper surface of the working level 6 (cf. FIGS. 2b–d). Thus particularly the buffer structure 3 can be used for different forming operations, the lower tool 8 being the stopper. Thirdly (situation C), the lower tool can be used for forming work as shown in FIG. 2e, wherein the upper surface 8a of the buffer 8 used as the lower tool passes the upper surface of the working level 6 in the vertical direction. Fourthly, the cylinder-piston combination makes it possible to re-adjust the position of the lower tool 8, which is needed because of wearing and re-grinding, in a very simple way. Also the disadvantages of noise and vibration are reduced, because the working strokes have an impact on the hydraulic pressurized medium and not directly on the machine body.

The embodiment shown in FIG. 4 is formed in a way that the cylinder-piston combination 61 of the transfer device 17 comprises a recess 70 formed on the surface of the inner hole 59 of the stopper fixing body 16 in the longitudinal direction of the stopper structure 3. The ends 63, 64 of the recess 70 are provided with pressurized medium connectors 65, 66 penetrating the stopper fixing body 16. In the upper part of the piston rod 62, there is a flange 67 forming the actual piston, its radial front surfaces 68, 69 facing the ends 63 and 64. The area of the lower front surface 69 is greater than the area of the upper front surface 68, because a greater force is required upwards than downwards. Thus the diameter of the tool fixing body 60 can be greater than the diameter of the piston rod 62, wherein the flange 67 has a greater diameter than both the tool fixing body 60 and the piston rod 62.

The surfaces 64 and 69 are substantially close to or facing each other in the situation A. In the position shown in FIG. 4, i.e., when the flange 67 is at the middle section of the recess 70, the operation is either in situation B or moving to situation C, in which the surfaces 63 and 68 are substantially close to each other in a way that an excitation pressure space is left therebetween (as in situation A), as also when the surfaces 64 and 69 are close to each other.

When the surfaces 64 and 69 are approaching each other, i.e., when the operation is close to situation A, the fixing pressure is released from the pressurized medium space 75 through the pressurized medium channel system 73 in the stopper fixing body 16 and through the pressure channel system 74 in the tool fixing body. A mechanical contact is formed between a lockpin cam 78 and the stopper fixing body 16 (surfaces 16a and 18a, i.e. the upper front surface of part 16 and the lower surface of the flange part of part 18), wherein the fastening of the lower tool 8 is detached between the outer surface of an axial projection 91 on the tool fixing body 60 and the inner hole 92 in the lower tool 8. The pressure channel system 74 is connected with the pressurized medium space 75 which is effective between the tool fixing body 60 and the tool fixing device 18 and is used for the hydraulic locking of the lower tool 8 in connection with the stopper structure 3.

At this stage, the front surfaces 76 and 77 (the lower front surface 76 in the tool fixing device 18 and the upper front surface 77 in the tool fixing body 60) are moved in the axial direction (against each other in the longitudinal direction of the stopper structure 3) and the volume of the pressurized medium space 75 is reduced to the excitation volume. Thus the locking of the lower tool 8 is released, and it can be detached in the lateral direction (perpendicular to the main level of FIG. 6) from the retaining structure of the lockpin cam 78 (in the fixing device 18) and the groove 79 (in the lower tool 8) for example manually or by using a manipulator. After the exchange of the lower tool 8, the tool fixing body 60 is moved upwards by using the cylinder-piston combination 61, wherein by using the pressurized medium connection between the parts 73 and 74, the pressurized medium space 75 is pressurized during the relative movement between the parts 16 and 60, wherein the pressurized medium fills up and enlarges the pressurized medium space 75. The mechanical contact between the parts 16 and 18 is maintained, until there is a mechanical contact between the surfaces 8b and 80. The lower tool 8 is locked by an axial force effective between the upper front surface 80 of the tool fixing body 60 and the lower front surface 8b of the lower tool 8 from the pressurized medium space 75. The force between the surfaces 8b and 80 is transferred via the lockpin cam-groove structure 78, 79.

In structural respects, the pressurized medium space 75 is formed into the inner hole 81 of the bush-like fixing device 18 of the lower tool 8 as a recess 82 having the above-mentioned radial front surface 76. In a corresponding manner, the outer surface of the tool fixing body 60 is provided with a recess whose upper radial front surface is the above-mentioned front surface 77.

In the lower part of the stopper structure 3, between the stopper fixing body 16 and the piston rod 62, a device 84 is placed for rotating the lower tool 8, being part of the transfer device 17, wherein the piston rod 62 is surrounded by a bush-like tooth wheel rim or a corresponding rotary means 85, mounted on bearings 88 in the stopper fixing body 16. A driving means, such as a worm pipe 86, for driving the tooth wheel rim 85 is mounted on bearings on the stopper fixing body 16. The tooth wheel rim 85 is coupled to be dead in relation to the piston rod 62 with a sliding key 87 which makes possible the axial movement of the rotating device 84 and the piston rod 62 in relation to each other in the longitudinal direction of the piston rod 62. The rotating device 84, which is substantially similar to the rotating device 23 in the buffer 10 and also driven with an electric engine (not shown in the figures), is driven to bring the lower tool 8 used at the time to the desired working position in the radial direction of the lower tool.

FIG. 4 shows a group of packings 83 which are naturally needed between constructively movable parts in hydraulic applications.

Figure 5:
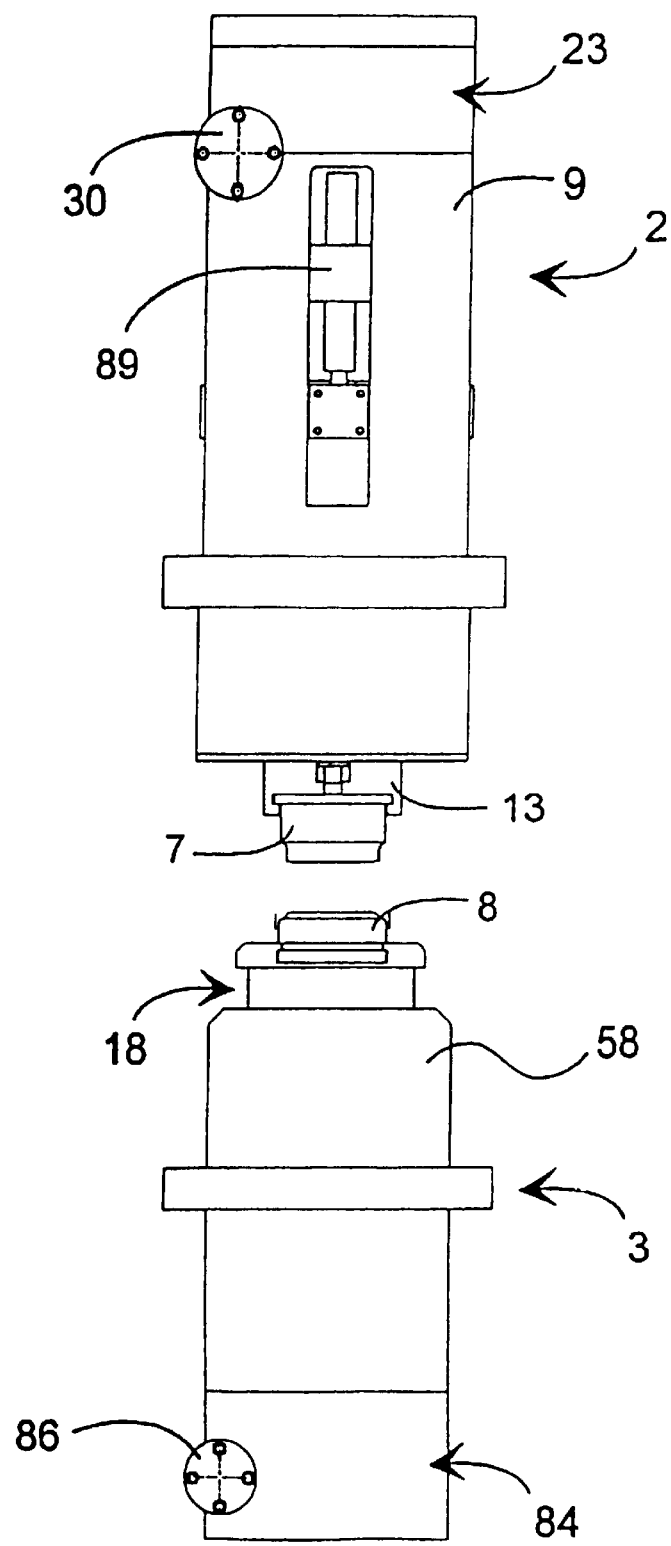
FIG. 5 shows the buffer and stopper structures seen from the side.

FIG. 5 shows the parts corresponding to the structures of FIGS. 3 and 4 seen from the side and indicated with the reference numerals of FIGS. 3 and 4 for the respective structural parts. In FIG. 5, the reference numeral 89 indicates the position detector of the auxiliary transfer body.

Figure 6:
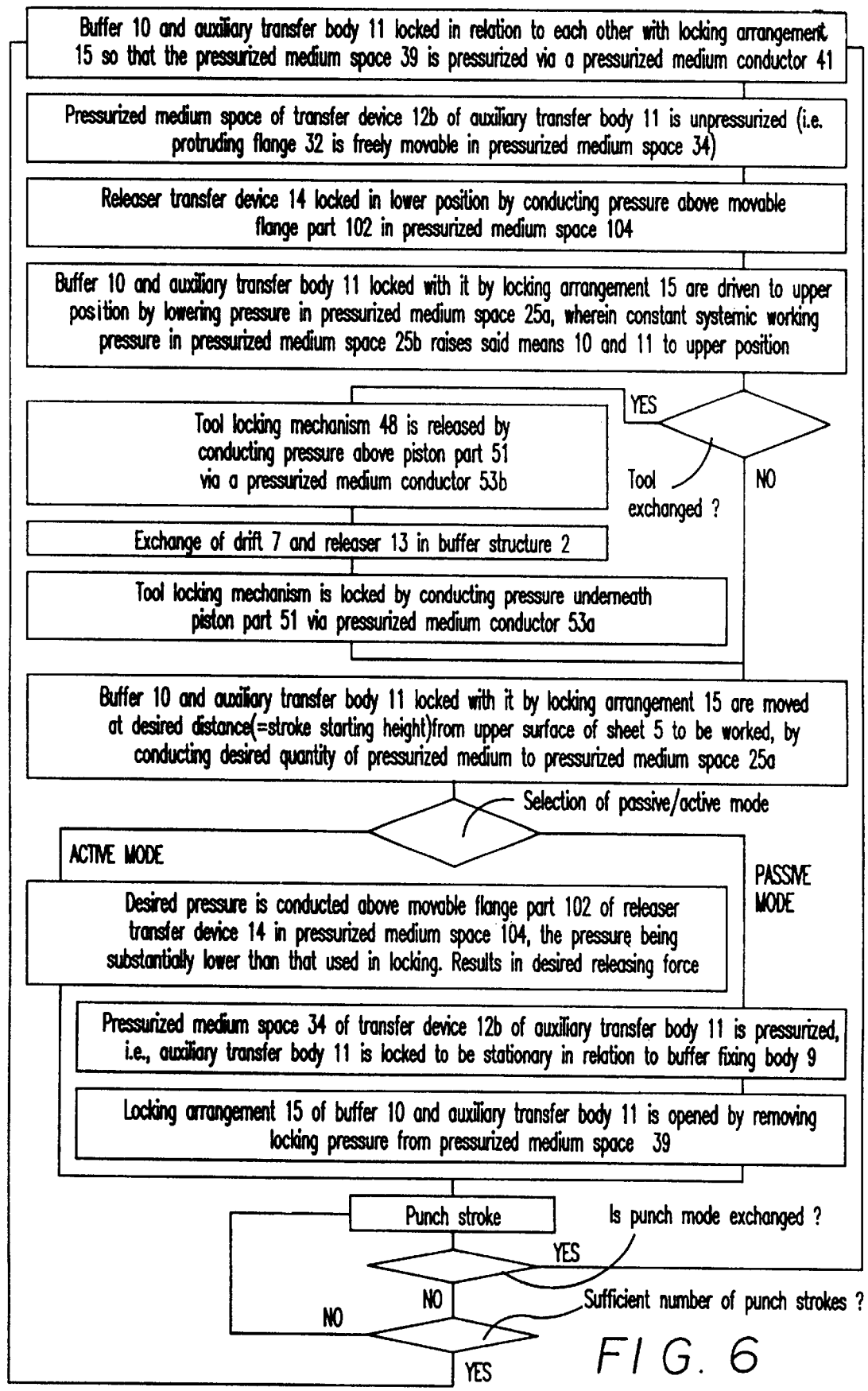
FIG. 6 is a flow chart illustrating the operating principle of the buffer structure.

FIG. 6 is a flow chart showing the operating principle of the buffer structure and the selection between active and passive mode, with brief explanations. The flow chart clarifies and supplements the description presented above.

Figure 7:
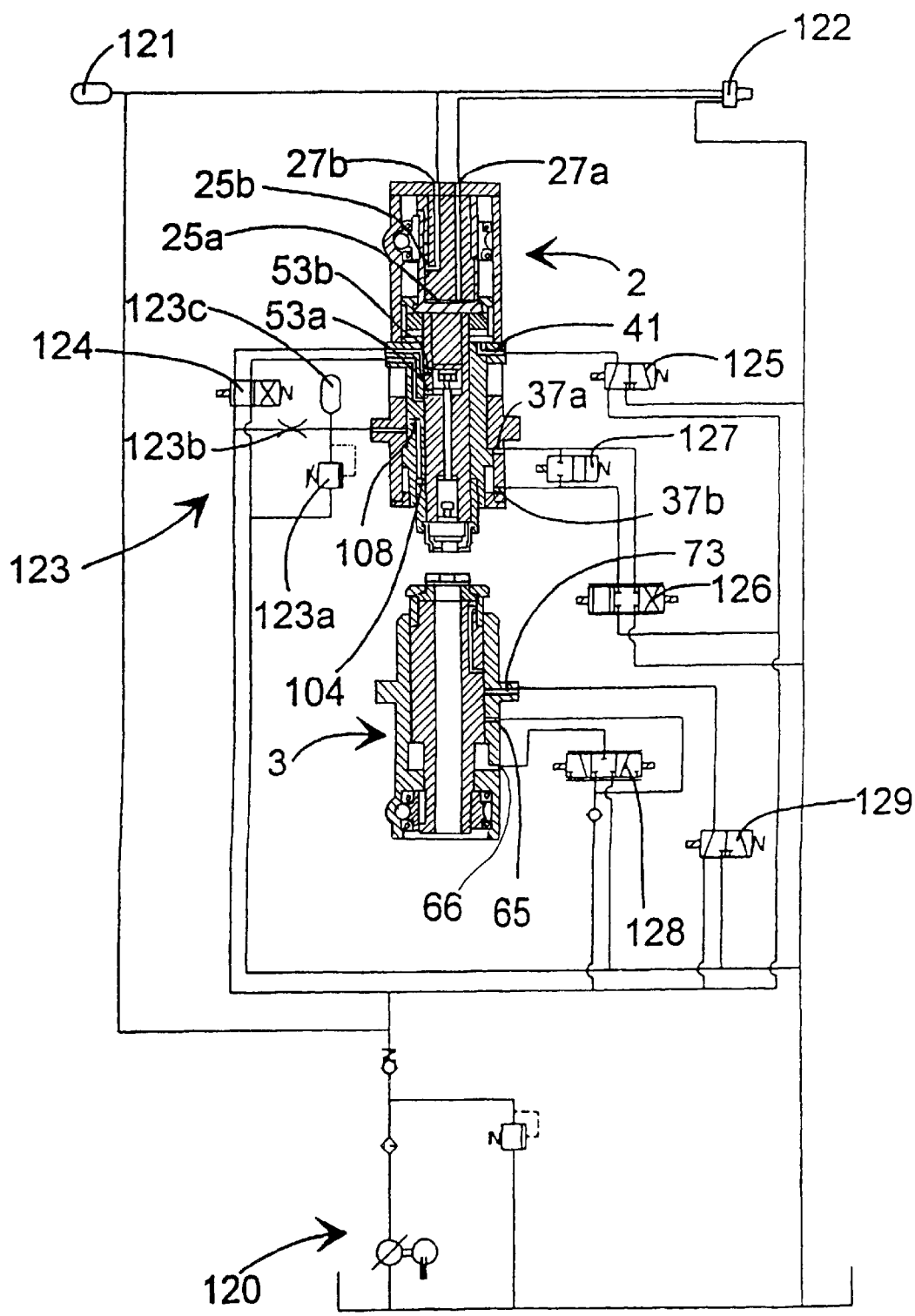
FIG. 7 is a hydraulic chart for operating the buffer and stopper structures.

Further, FIG. 7 is a diagram showing the hydraulic control system of the pressurized medium in the buffer and stopper structures. In FIG. 7, the reference numerals used indicate the same pass as before, where applicable. In this respect, reference is made to the above description.

The hydraulic system of FIG. 7 comprises a driving aggregate 120 for producing the hydraulic pressure in the system. The aggregate is connected via normal hydraulic pipes to the valves controlling the actuators valve 124 for tool change and valve 125 for the locking arrangement.

The system comprises a hydraulic accumulator 121 and a servo valve 122 controlling the buffer 10. The actual punching operation is effected by a differential cylinder used as the transfer device 12a of the buffer 10 and comprising parts 25a, 25b, 27a, 27b and 122. For the operation of the differential cylinder, it is essential that the pressurized medium space 25b is always under systemic pressure and the pressurized medium space 25a is under the pressure corresponding to a balanced situation. The pressure in the pressurized medium space 25a is controlled with the servo valve 122.

The system comprises further a releasing force control system 123, consisting of pressure control valve 123a, venturi 123b and hydraulic accumulator 123c. The purpose of the control system 123 is to control the releasing force when operating in the active mode. The pressure control valve 123a is used to adjust the pressure setting value of the pressure space 104. The releasing force is directly proportional to the pressure in the pressure space 104. By means of the venturi 123b and the hydraulic accumulator 123c, the pressure in the pressure space 104 is kept constant irrespective of the volume of the pressure space 104.

Valves 126 and 127 are used for controlling the operation of the auxiliary transfer body 11. Using a free circulation valve 127, the pressurized medium connectors 37a and 37b can be connected with each other, wherein the auxiliary transfer body 11 is released in the active mode. When the free circulation valve 127 is in a position that there is no pressurized medium connection between the pressurized medium connectors 37a and 37b, the position of the auxiliary transfer body 11 can be guided with a directing valve 126.

A directing valve 128 controls via the pressurized medium connectors 65 and 66 the cylinder-piston combination 61 in the stopper 3. Further, a directing valve 129 controls the pressurized medium space 75 through pressurized medium channel systems 73 and 74.

What is claimed is:

1. Sheet working center comprising:
   a body;
   a work table whereon a sheet to be worked is placed;
   means for holding and moving said sheet on said table;
   upper and lower tools for working on opposite sides of said sheet at a working level; and
   a transfer device for moving said lower tool in a direction perpendicular to the plane of said sheet, said lower tool being mounted in said transfer device which is movable along said direction relative to said body, said lower tool being movable by said transfer device to at least the following positions relative to said body
   a) a first position below said working level whereat said lower tool is accessible for exchange and/or maintenance;
   b) a second position whereat said lower tool is positioned substantially at said working level for cooperating with said upper tool to work on said sheet; and
   c) a third position whereat said lower tool is positioned below said working level and movable therefrom to said working level to work on said sheet.

2. Sheet working center according to claim 1, wherein said transfer device comprises a cylinder piston mechanism using a pressurized medium.

3. Sheet working center according to claim 2, wherein said cylinder piston mechanism is provided with a flange at its piston rod having a diameter exceeding the diameter of said piston rod, and being inserted in a recess in a stopper fixing body, wherein pressurized medium connectors are connected with said recess for directing the impact of said pressurized medium onto opposite front surfaces of said flange.

4. Sheet working center according to claim 3, wherein the diameter of said piston rod of the cylinder piston mechanism is smaller than the diameter of said flange and that the diameter of said tool fixing body is greater than the diameter of said piston rod.

5. Sheet working center according to claim 2, wherein said tool fixing body is arranged to be movable downwards for releasing said lower tool; and
   wherein said stopper fixing body and said tool fixing device are provided with means which unlocks said lower tool by mechanical contact.

6. Sheet working center according to claim 1, wherein said transfer device is positioned to be movable in the longitudinal direction of an inner hole in a stopper fixing body.

7. Sheet working center according to claim 6, wherein a tool fixing body is mounted to an upper part of said transfer device, which is also movable in said inner hole of said stopper fixing body, said lower tool being fixed in the upper part of said tool fixing body.

8. Sheet working center according to claim 1, wherein said transfer device and said tool fixing body are hollow form pieces.

9. Sheet working center according to claim 1, further comprising:
   a tool fixing device having a pressurized medium space used for locking said lower tool;
   a stopper fixing body provided with a pressurized medium connection to a pressurized medium channel system in a tool fixing body, said tool fixing body being connected with said pressurized medium space in said tool fixing device;
   wherein said connection is coupled when said lower tool is moved into said first position or upwards from said first position.

10. Sheet working center according to claim 1, further comprising:
    a tool fixing body having an upper part provided with a recess adjoining its outer surface for forming a pressurized medium space to lock said lower tool.

11. Sheet working center according to claim 1, wherein the tool fixing device comprises in its upper part a lockpin cam means for receiving a groove in said lower tool, wherein said tool fixing device comprises a front surface in its lower part for forming part of the pressurized medium space in said recess.

12. Sheet working center according to claim 1, wherein said lower tool is locked with an axial force applied between a lower front surface of said lower tool and an upper front surface of a tool fixing body.

13. Sheet working center according to claim 1, wherein the sheet working center comprises, as part of said transfer device, a rotating device for rotating said lower tool around a longitudinal axle of a stopper structure.

14. Sheet working center according to claim 1, wherein said lower tool acts as a stopper for said upper tool when it is positioned at said second position.

15. Sheet working center according to claim 1, wherein said lower tool effects work on said sheet at said third position by performing a forming operation on said sheet.

16. In a sheet working center having a body, a work table whereon a sheet to be worked is placed, and means for holding and moving said sheet on said table, apparatus comprising:
    upper and lower tools for fabricating said sheet at a working level;
    upper transfer means for driving said upper tool in a direction perpendicular to the plane of said sheet; and lower transfer means working independently of said upper transfer means for driving said lower tool along said direction to a position below said working level, said lower transfer means further driving said lower tool from said position to said working level for fabricating said sheet;

wherein said upper tool acts as a stopper for said lower tool when said lower tool is positioned at said position below said working level and further driven to said working level to fabricate said sheet.

17. Apparatus of claim 16, wherein said lower tool fabricates said sheet by performing a forming operation on said sheet.

18. In a sheet working center having a body, a work table whereon a sheet to be worked is placed, and means for holding and moving said sheet on said table, apparatus comprising:

upper and lower tools for fabricating said sheet at a working level;

upper transfer means for driving said upper tool in a direction perpendicular to the plane of said sheet; and lower transfer means working independently of said upper transfer means for driving said lower tool along said direction to a position below said working level, said lower transfer means further driving said lower tool from said position to said working level for fabricating said sheet;

wherein said lower transfer means is adaptable to further drive said lower tool to an other position below said working level whereat said lower tool is accessible for exchange and/or maintenance.

* * * * *